UNITED STATES PATENT OFFICE.

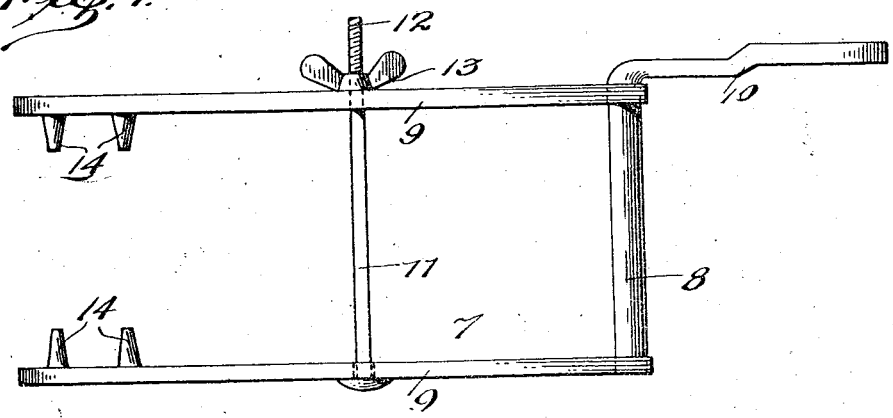
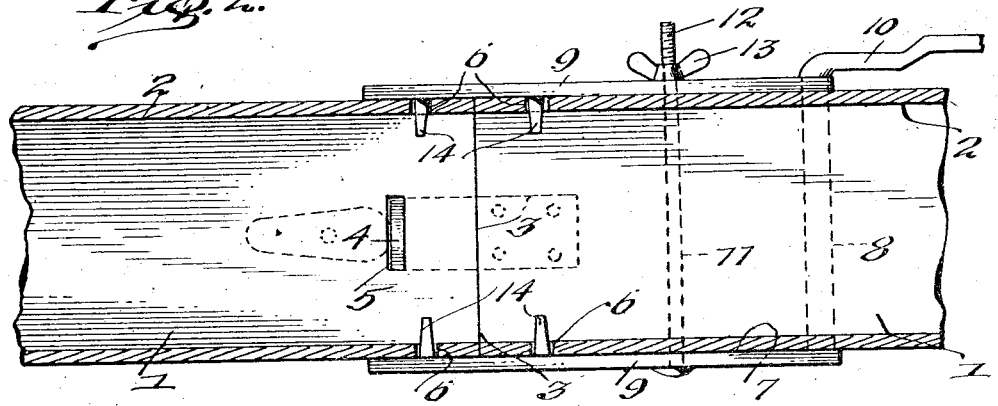

FREDELIA H. MOYER, OF CLEVELAND, OHIO, ASSIGNOR TO GENERAL RIM COMPANY, OF NEW YORK, N. Y., A CORPORATION OF NEW YORK.

RIM-TOOL.

1,195,252.

Specification of Letters Patent. Patented Aug. 22, 1916.

Application filed March 31, 1915. Serial No. 18,326.

*To all whom it may concern:*

Be it known that I, FREDELIA H. MOYER, a citizen of the United States, and a resident of the city of Cleveland, in the county of Cuyahoga and State of Ohio, have invented certain new and useful improvements in Rim-Tools, of which the following is a specification.

The invention relates to improvements in rim tools and has particular reference to that type of tool utilized in connection with the demounting and remounting of tires on demountable rims, and it has as its object, that of facilitating the manual operation of quickly detaching and attaching pneumatic tires for any type of split demountable rim.

Another object of the invention is the providing of a tool having associated with it means for starting the tire beads from off the clencher flanges of the rim proper, and when adjacent the split in said rim and when said rim is broken or collapsed to a concentric position said tool provides means for holding said rim in an unlocked position for the removal of the tire therefrom.

In the following is described in connection with the accompanying drawings, one embodiment of the invention the essential parts of being more particularly pointed out hereinafter in the claims.

In the drawings Figure 1 is a plan view of the rim breaking tool, Fig. 2 is a plan view of a split rim showing the tire beads thereon in annular section, and illustrating the position thereon of the rim breaking tool, and Fig. 3 is a plan view of a split demountable rim showing the position of the breaking tool thereon as holding said rim in a broken locked position in which position said rim is permanently held until a deflated tire and tube is removed therefrom, said position being maintained until a new pneumatic shoe and tube is placed thereon and the tool removed to permit of the re-locking of said split rim.

Similar numerals of reference indicate similar parts throughout the several views.

In the drawings (1) indicates a demountable rim provided with tire reception flanges (2) provided at its inner surface with a suitable form of supporting means when placed upon a felly band or supporting base rim forming part of a demountable rim structure. The body of said rim (1) is split transversely thereof on a diagonal plane at a suitable point as at (3) and has mounted on one of the split ends thereof a locking hook (4) adapted to engage a suitable reception member (5) on the opposite split end of said rim. The respective split ends of said rim have formed therein immediately adjacent said split portion thereof apertures (6) the object of which is hereinafter described.

The tool (7) comprises a U-shaped member preferably constructed of spring steel, the cross bar (8) thereof forming a handle portion and a means of rigidly supporting the two longitudinally extending arms (9). Said cross head or handle (8) is provided with a laterally extending handle (10) adapted to permit an operator of the tool to firmly grip the same during the operation of breaking a split rim for the removal of a pneumatic tire therefrom. By actuating the tool (7) by means of handle (10), an operator's hand is removed from the collapsing of the rim providing by this distance means for preventing injury to the operator thereof. Said cross head (8) have mounted thereon and extending vertically with relation thereto a bolt (11) provided with a threaded end (12) adapted to receive at that point a thumb nut (13) for adjusting said arms (9) into the desired position for diverse widths of rim bodies. The outer ends of said arms (9) have mounted thereon a predetermined distance apart two tapered lugs (14) and so positioned on said arms as to engage the apertures (6) in the clencher beads (2) of said (1) on the respective split ends of said rim, and the shape of said tool (9) is so that the same conforms to the inner contour or surface of the demountable rim both in the locked and unlocked positions of the same.

The natural position of tool (7) is as that illustrated in Fig. 2 of the drawings that is during the concentric locked position of rim (1), the position of said tool after actuating being as that as illustrated in Fig. 3 of the drawings.

Studs (14) are of a greater length than the thickness of the metal of which the demountable rim is made and when said lugs (14) are inserted within holes or apertures (6) and when thumb nut (13) on bolt (11) is drawn to its set position, said lugs (14) press the bead of a pneumatic tire from beneath the clencher flanges (2) on rim (1) and hold said beads of said pneumatic tire in that position during the unlocking of the rim at the split thereof, and also during the demounting of a tire and tube therefrom as well as during the operation of replacing a new tube and shoe thereon, said toe (7) being adapted to permanently hold the rim in said unlocked position, owing to the fact that the back set of lugs (11) pass beyond the center of the outer set of lugs and place the rim structure (1) in an eccentric position as that as shown in Fig. 3 of the drawings.

It is obvious that the device as herein shown and described may be widely varied without departing from the spirit of the invention.

What is claimed and desired to secure by Letters Patent of the United States is:—

1. A relaxing device of the character described for the ends of a split rim, comprising rigid side bars and a connecting bar at one end, means mounted in said bars for moving the ends toward each other, and means mounted in opposed ends of said arms adapted to engage apertures in opposite extremities and of opposite sides of a demountable rim for relaxing the same, and returning the same to place.

2. A relaxing device of the character described comprising parallel side bars and a cross bar connecting the side bars at one end, means mounted in said bars for moving their free extremities toward each other, and spaced pairs of inwardly pointing lugs mounted in the ends of said arms.

3. A relaxing device for the split ends of a detachable rim of the character described comprising a cross head and two bars longitudinally extending therefrom, a bolt mounted in one of said arms and projecting through the other of said arms, a thumb screw operative on said bolt engaging one of said arms, said bolt and screw being adapted to adjust the distance between the extremities of said bars and a pair of lugs mounted in the end of each of said arms adapted to engage apertures adjacent to the split in said detachable rim.

4. A relaxing device for a split clencher rim, comprising a cross head having a laterally projecting integral handle and two spaced bars longitudinally extending therefrom, a bolt mounted in one of said arms and projecting through the other of said arms, a thumb nut operative on said bolt engaging one of said arms adapted to adjust said arms relatively to the width of the rim, spaced pairs of lugs mounted on the respective ends of said arms on the inner sides thereof, and adapted to engage apertures adjacent to the split in said clencher rim and to press the clencher bead of the pneumatic shoe from beneath the flanges on said rim, the position of said lever when actuated to break said rim and the split thereof being adapted to hold said rim in an unlocked position.

In testimony whereof I have hereunto signed my name in the presence of two subscribing witnesses.

FREDELLIA H. MOYER.

Witnesses:
H. L. BELKNAP,
MAYME SMITH.